(12) United States Patent
Hinkson et al.

(10) Patent No.: US 7,142,641 B2
(45) Date of Patent: Nov. 28, 2006

(54) AUTOMATED CONFIGURATION OF SECURITY SYSTEM CONTROL PANELS USING CALLING NUMBER INFORMATION

(75) Inventors: Richard H. Hinkson, Plainview, NY (US); Christopher D. Martin, Plainview, NY (US); David S. Zakrewski, Babylon, NY (US)

(73) Assignee: Honeywell International, Inc., Morristown, NJ (US)

( * ) Notice: Subject to any disclaimer, the term of this patent is extended or adjusted under 35 U.S.C. 154(b) by 2 days.

(21) Appl. No.: 10/867,449

(22) Filed: Jun. 14, 2004

(65) Prior Publication Data

US 2005/0276389 A1 Dec. 15, 2005

(51) Int. Cl.
H04M 11/04 (2006.01)

(52) U.S. Cl. .............................. 379/37; 379/40; 379/41

(58) Field of Classification Search ............ 329/37–50, 329/102.02, 100.01; 340/541, 507, 508; 709/222, 221, 223, 229
See application file for complete search history.

(56) References Cited

U.S. PATENT DOCUMENTS

| | | | | |
|---|---|---|---|---|
| 5,511,109 | A * | 4/1996 | Hartley et al. | 379/40 |
| 5,600,712 | A * | 2/1997 | Hanson et al. | 379/142.06 |
| 6,191,739 | B1 * | 2/2001 | Gabber et al. | 342/458 |
| 6,345,294 | B1 * | 2/2002 | O'Toole et al. | 709/222 |
| 6,888,459 | B1 * | 5/2005 | Stilp | 340/541 |
| 2003/0233429 | A1 * | 12/2003 | Matte et al. | 709/221 |

OTHER PUBLICATIONS

Product Brochure for ADEMCO Compass Downloader, pp. 150-152, dated May 27, 2004.
Product Brochure for ADEMCO VISTA 32-FB, pp. 1-5, dated May 27, 2004.
Users Manual for ADEMCO No. 4130PC V-LINK Downloading Software, pp. 2, 3, 66, 67, dated Nov. 1989.

* cited by examiner

*Primary Examiner*—Melur Ramakrishnaiah
(74) *Attorney, Agent, or Firm*—Scully, Scott, Murphy & Presser, P.C.

(57) ABSTRACT

A method is disclosed of automatically configuring security system control panels by using calling number information that is provided by a telephone call made to a specified telephone number, such as Calling Number Delivery (CND) information that is provided by a telephone call made to a toll free (800) telephone number. After an initial installation of a security system at an installation site, the security system control panel dials the specified telephone number to establish a telephone connection to a security company database center. The security company database center receives the calling number information that includes the telephone number of the installation site, and utilizes the telephone number of the installation site to look up in a database the security system control panel configuration information. This control panel configuration information is then automatically transferred and downloaded over the telephone connection to the security system control panel to configure and program the control panel for operation. The method of establishing a connection to a specified telephone number can also be utilized to reconfigure an already-installed security system, and also to configure many other devices and systems unrelated to security systems that need to be customized or configured.

20 Claims, 2 Drawing Sheets

AUTOMATED CONFIGURATION OF SECURITY SYSTEM CONTROL PANELS USING CALLING NUMBER INFORMATION

BACKGROUND OF THE INVENTION

1. Field of the Invention

The present invention relates generally to a method of automatically configuring security system control panels by using calling number information that is provided by a telephone call made to a specified telephone number, such as a toll free (800) telephone number, typically following initial installation of the security systems and control panels.

After an initial installation of a security system at an installation site, the security system control panel dials a specified telephone number to establish a telephone connection to a security company data center. The security company data center receives the calling number information, including the telephone number of the installation site, and utilizes the telephone number of the installation site to look up in a database a predefined set of account information, such as the account number, telephone numbers to be dialed under different conditions, and other security system control panel configuration information. This control panel configuration information data is then automatically downloaded from the database over the telephone connection to the security system control panel to configure and program the security system control panel for operation.

The method of establishing a telephone connection to a specified telephone number can also be utilized to reconfigure an already-installed security system, and can also be utilized for many other diverse devices and systems unrelated to security systems that can be customized or configured by data transferred over a telephone connection.

2. Discussion of the Prior Art

Large security system installation companies attempt to minimize the time and expense of installing and programming security systems. The installation of a security system usually requires a trained mechanical installation technician to install and connect all of the components of the security system, and then requires a configuration of a control panel of the security system. The configuration of the control panel usually requires that the installation technician enter a number of parameters to program the security system control panel before it can be made operational. It is desirable for technical and economic reasons that an installation technician do as little programming as possible in the installation of a security system.

In addition, in the present state of the art, a security system company might have to stock a number of different models of the same basic equipment, with each different model differing only by having different pre-programmed telephone numbers.

SUMMARY OF THE INVENTION

The present invention provides a method of automatically configuring security system control panels by using calling number information that is provided by a telephone call made to a specified telephone number, such as a toll free (800) telephone number. In one embodiment of the present invention, after an initial installation of a security system at an installation site, the security system control panel dials a specified telephone number to establish a telephone connection to a security company database center. The security company database center receives the calling number information, which includes the telephone number of the installation site, and utilizes the telephone number of the installation site to look up in a database a predefined set of account information, such as the account number, telephone numbers to be dialed under different conditions, and other security system control panel configuration information. This control panel configuration information is then automatically transferred and downloaded from the database over the telephone connection to the security system control panel to configure and program the control panel for operation.

In one disclosed embodiment, the present invention is utilized to program and configure a security system control panel after an initial installation of the security system. However, the present invention also has post-installation utility in that the same method of establishing a connection to a specified telephone number can also be utilized to reconfigure an already-installed security system whenever any such reconfiguration is required.

Moreover, the same method of establishing a connection to a specified telephone number can also be used for many other diverse devices and systems unrelated to security systems that need to be customized or configured, as long as the devices and systems have access to a telephone line to establish a connection to a specified telephone number.

BRIEF DESCRIPTION OF THE DRAWINGS

The foregoing objects and advantages of the present invention for automated configuration of security system control panels using calling number information may be more readily understood by one skilled in the art with reference being had to the following detailed description of several embodiments thereof, taken in conjunction with the accompanying drawings in which.

DETAILED DESCRIPTION OF THE INVENTION

Figure 1:
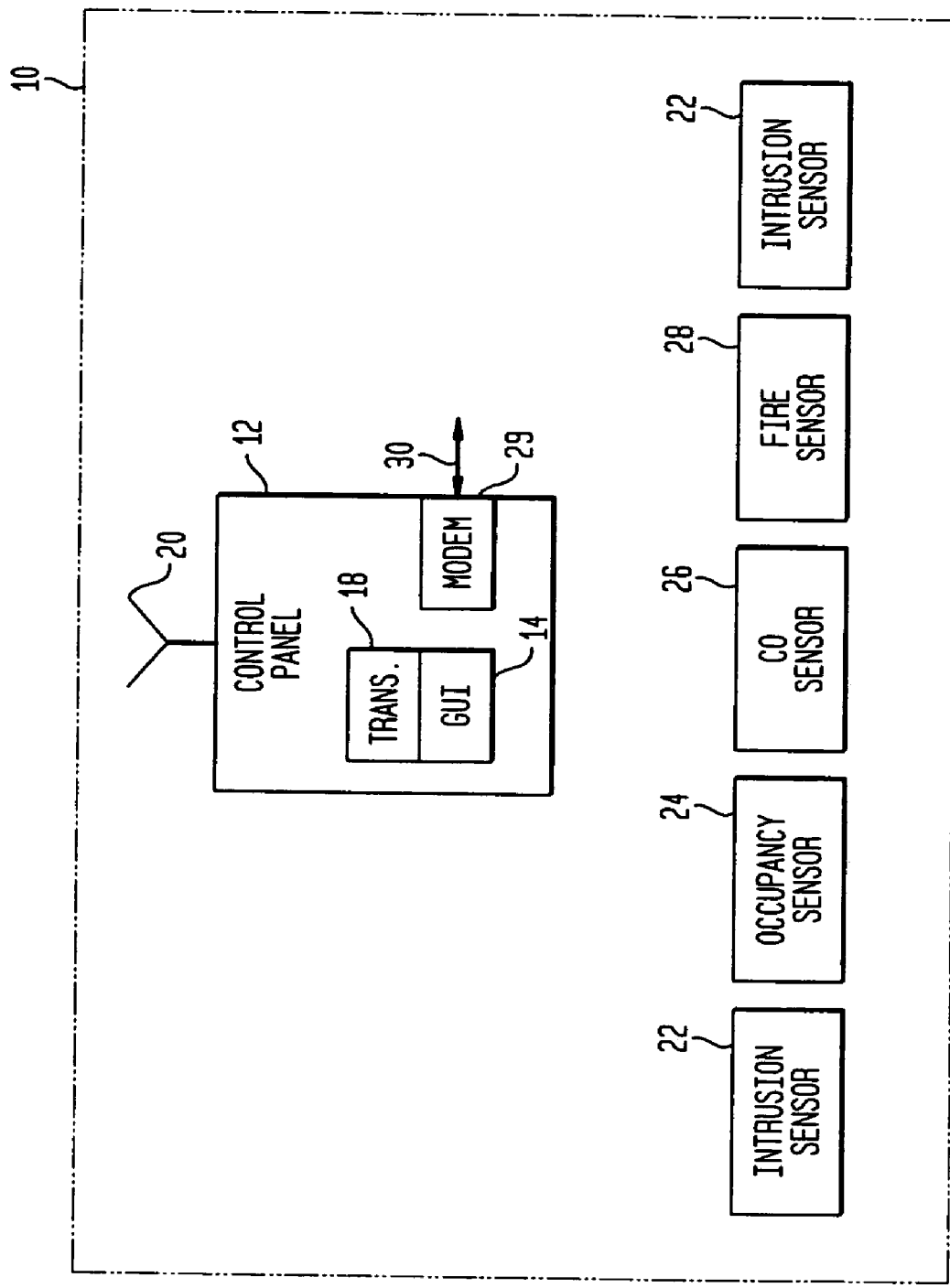
FIG. 1 illustrates a typical security system for a residential or commercial premises that includes a security system control panel which must be configured and programmed after an initial installation of the security system at the premises.

FIG. 1 illustrates a typical security system for a residential or commercial premises 10 that includes a security system control panel 12 provided at a central accessible location, such as just inside the front entrance to the premises protected by the security alarm system. The control panel provides a person or homeowner with a display 14 of information on the complete status of the security system, such as a display of pertinent parameters and conditions of the security system, and also possibly provides a display of video images provided by the security system video cameras 16.

The control panel also enables a person to control operation of the security system, such as arming or disarming of the security system by entry of a proper security code and of specific commands. The control panel might include a GUI display (graphical user interface) 14 to enable a user to view the status of the security alarm system and also to enter data into and access and control the security system.

The security system control panel also includes an RF transmitter or transceiver 18 and antenna 20 for short range RF transmissions to transmit and possibly receive (with an RF transceiver) RF transmitted data, whereby the security system can be a wireless system with many of the communications between sensors and the control panel being by short range RF communication messages.

A typical residential or commercial security system also includes a plurality of intrusion security sensors 22 mounted at doors and windows to detect any intrusions thereat and motion/occupancy sensors 24 mounted at strategic locations in the premises to detect the presence of a person thereat which are connected by security system wiring to the security system control panel. A typical security system might also include one or more CO sensors 26 and smoke or fire sensors 28 mounted at strategic locations in the premises to detect any of those conditions in the premises, with those sensors also being connected by security system wiring to the security system control panel. The security system control panel monitors signals from the security system sensors and video cameras to determine the status of the security system.

A typical residential or commercial security system also includes a modem 29 and a telephone line or cable connection to allow bi-directional data communications over telephone lines and/or a cable system and/or the internet, as indicated schematically at 30.

After an initial installation of a typical security system as illustrated in FIG. 1 by an installation technician, the control panel must be programmed and configured to enable the security system to become operational. In a typical security system installation, the security system control panel is programmed and configured to call a number of different telephone numbers under a number of different circumstances, such as the telephone numbers of the security company data center, the local police department, the local fire department, and any additional telephone numbers designated by the owner/supervisor of the premises.

The present invention uses calling number information that is provided by a telephone call when the telephone call is made to a specified telephone number, such Caller Number Delivery (CND) information that is provided by a telephone call made to a toll free (800) telephone number, to program and configure the security system control panel 12 after an initial installation of a security system.

The Calling Number Delivery information is similar to Caller ID information, except that it is always provided with a toll free telephone number and cannot be blocked.

The security system company creates and maintains a security system database that stores and indexes a plurality of installation site telephone numbers, each associated with configuration data required to set up and configure the security system control panel at that installation site. At the security system database, a record is created which indexes the installation site premises telephone number and associates it with part or all of the set up information needed to set up and configure the security system control panel.

Figure 2:
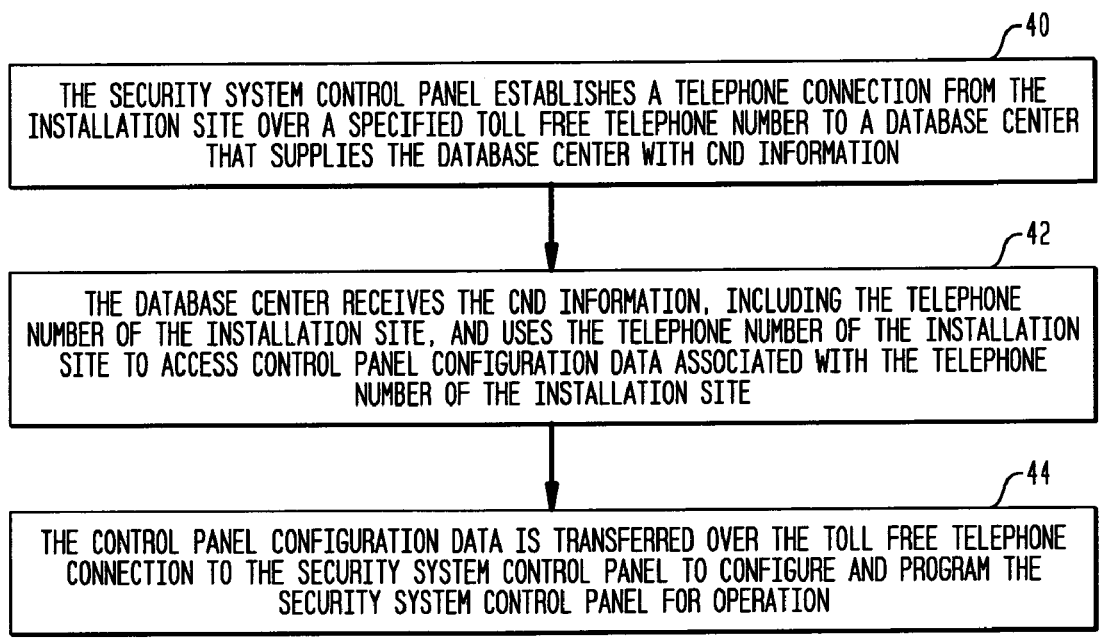
FIG. 2 is a process flow diagram of the method steps involved in automatically configuring a security system control panel of a security system at an installation site by using calling number information that is provided by a telephone call made to a specified telephone number.

FIG. 2 is a process flow diagram of the method steps involved in automatically configuring a security system control panel of a security system at an installation site by using calling number information that is provided by a telephone call made to a specified telephone number. At block 40, the security system control panel establishes a telephone connection from the installation site over a specified toll free telephone number to a database center that supplies the database center with Calling Number Delivery (CND) information provided by a telephone call made to a toll free telephone number. At 42, the database center receives the CND information, including the telephone number of the installation site, and uses the telephone number of the installation site to access control panel configuration data associated with the telephone number of the installation site, such as telephone numbers to be dialed under different conditions. At 44, the control panel configuration data is transferred over the toll free telephone connection to the security system control panel to configure and program the security system control panel for operation.

One major advantage and benefit of the present invention is that the installation technician has to do very little programming and configuring of the security system control panel, with the programming and configuring of the security system control panel being accomplished automatically by the transfer of data over the telephone connection.

Another benefit of the present invention is that a security system company now needs to stock only a single model/version of the same basic equipment that can be configured and programmed at the security system installation site over the telephone connection to a single specified telephone number, instead of having to stock different models with different programmed telephone numbers.

Moreover, the same technique, employing establishing a connection to a specified telephone number, can also be used for many other diverse devices and systems, unrelated to security systems, that need to be customized or configured, as long as the devices and systems have access to a telephone line to establish a connection to a specified telephone number.

The installer of the security system installs and connects all of the components and equipment of the security system, and then activates a special setup or installation mode, such as by using a special key sequence or some other known activation method.

The security system control panel then dials the specified telephone number. At the security system data center, the telephone network provides the installation premises telephone number as part of the calling number information. An installation program at the security company data center then utilizes the premises telephone number to retrieve from a database the customer records associated with that telephone number. The telephone call is answered to establish a telephone data connection, and the security system data center then downloads the operating and configuration parameters to the security system control panel over the telephone data connection.

Almost all of the described installation steps can be performed without intervention by the security system installation technician, thereby allowing the programming and configuration of the security system control panel to proceed at the convenience of the security system installation technician.

Calling Number Delivery information is similar to Caller ID information, except that it is always provided with a toll free (800) telephone number and cannot be blocked. One advantage of the present invention over the use of a regular (non-toll free) telephone number for the security system data center is that some telephone equipment blocks and will not transfer the caller ID information. Another advantage is that usage of the telephone is prepaid/free, whereas some telephone calls to regular (non-toll free) telephone numbers from some security system installation sites, typically over very large geographical areas, may involve long distance calls and incur the added expense of long distance telephone charges.

While several embodiments and variations of the present invention for an automated configuration of security system control panels using calling number information are described in detail herein, it should be apparent that the disclosure and teachings of the present invention will suggest many alternative designs to those skilled in the art.

What is claimed is:

1. A method of automatically configuring a security system control panel of a security system at an installation site by using calling number information that is provided by a telephone call made to a specified telephone number, comprising:

establishing a telephone connection from the installation site to the specified telephone number, a security system control panel supplies the specified telephone number with the calling number information which includes the telephone number of the installation site;

connecting to a database center that uses the telephone number of the installation site to access control panel configuration data associated with the telephone number of the installation site;

transferring the control panel configuration data over the telephone connection to the security system control panel to configure and program the security system control panel for operation.

2. The method of claim 1, wherein the programming and configuring of the security system control panel is accomplished automatically by a program at the database center for transferring the configuration data over the telephone connection.

3. The method of claim 1, including creating a security system database which stores and indexes a plurality of installation site telephone numbers, to enable the use of an installation site telephone number to access stored configuration data required to set up and configure the security system control panel at that installation site.

4. The method of claim 1, including a security system company programming a single specified telephone number into all of the control panels of a given single model, to allow the given single model to be used by the security system company for all security system installations.

5. The method of claim 1, wherein a security system installation technician installs and connects all of the components and equipment of the security system, and then activates an installation mode to cause the security system control panel to dial the specified telephone number to establish a connection to the database center.

6. The method of claim 5, wherein the security system installation technician activates the installation mode by entering a special key sequence at the security system control panel.

7. The method of claim 1, wherein following installation and connection of all of the components and equipment of the security system, programming and configuring of the security system control panel is accomplished automatically by a program at the database center for transferring the configuration data over the telephone connection without intervention by a security system installation technician, thereby allowing the programming and configuration of the security system control panel to proceed at the convenience of the security system installation technician.

8. The method of claim 1, wherein an existing operational security system is reconfigured by causing the security system control panel to dial the specified telephone number to establish a connection to the database center.

9. The method of claim 1, wherein the security system control panel establishes a telephone connection to a specified toll free telephone number, said security system control panel supplies the specified toll free telephone number with Calling Number Delivery (CND) information provided by a telephone call made to the specified toll free telephone number.

10. The method of claim 1, further including programming a single specified toll free telephone number, that receives Calling Number Delivery (CND) information from telephone calls made to the specified toll free telephone number, into all of the control panels of a given single model, to allow the given single model to be used for all security system installations.

11. A method of automatically configuring a device at an installation site by using calling number information that is provided by a telephone call made to a specified telephone number, comprising:

establishing a telephone connection from the installation site to the specified telephone number, said device supplies the specified telephone number with the calling number information which includes the telephone number of the installation site;

connecting to a database center that uses the telephone number of the installation site to access device configuration data associated with the telephone number of the installation site;

transferring the device configuration data over the telephone connection to the device to configure and program the device for operation.

12. The method of claim 11, wherein the programming and configuring of the device is accomplished automatically by a program at the database center for transferring the configuration data over the telephone connection.

13. The method of claim 11, including creating a device database which stores and indexes a plurality of installation site telephone numbers, to enable the use of an installation site telephone number to access stored configuration data required to set up and configure the device at that installation site.

14. The method of claim 11, further including programming a single specified telephone number into all of the devices of a given single model, to allow the given single model to be used for all device installations.

15. The method of claim 11, wherein a device installation technician installs and connects all of the components and equipment of the device, and then activates an installation mode to cause the device to dial the specified telephone number to establish a connection to the database center.

16. The method of claim 15, wherein the device installation technician activates the installation mode by entering a special key sequence at the device.

17. The method of claim 16, wherein following installation and connection of all of the components and equipment of the device, programming and configuring of the device is accomplished automatically by a program at the database center for transferring the configuration data over the telephone connection without intervention by a device installation technician, thereby allowing the programming and configuration of the device to proceed at the convenience of the device installation technician.

18. The method of claim 11, wherein an installed operational device is reconfigured by causing the device to dial the specified telephone number to establish a connection to the database center.

19. The method of claim 11, wherein the device establishes a telephone connection to a specified toll free telephone number, said device supplies the specified toll free telephone number with Calling Number Delivery (CND) information provided by a telephone call made to said specified toll free telephone number.

20. The method of claim 11, further including programming a single specified toll free telephone number, that receives Calling Number Delivery (CND) information from telephone calls made to the specified toll free telephone number, into all of the devices of a given single model, to allow the given single model to be used for all device installations.

* * * * *